United States Patent

[11] 3,602,803

[72] Inventor Rudolf E. Six
  Roseville, Mich.
[21] Appl. No. 880,701
[22] Filed Nov. 28, 1969
[45] Patented Aug. 31, 1971
[73] Assignee Udylite Corporation
  Warren, Mich.

[54] VOLTAGE VERSUS CURRENT SENSING SYSTEM
  25 Claims, 4 Drawing Figs.

[52] U.S. Cl. .................................................. 323/20,
  204/327, 307/52, 323/22 SC
[51] Int. Cl. .................................................. G05f 1/40
[50] Field of Search .................................. 323/4, 9,
  16–22, 20, 22 T, 22 SC; 307/52–54; 204/323, 327

[56] References Cited
  UNITED STATES PATENTS
3,487,291 12/1969 Dowgiallo, Jr. ................. 323/20
3,517,301 6/1970 Huber .......................... 323/20

Primary Examiner—Gerald Goldberg
Attorneys—Peter F. Casella, Donald C. Studley, Richard P. Mueller and James F. Mudd ABSTRACT: A voltage versus current function sensing system for use in conjunction with power supplies for electrochemical processes, and particularly for sensing arcing and sparking in the load circuit or for determining the value of resistance of the load, the load being substantially a resistive load. The system includes a shunt for sensing the load current in the output buss and a load voltage sensing circuit, the current being fed to a preamplifier and a four quadrature multiplier, the output of the multiplier being fed to the input circuit of a subtracter circuit, and the voltage signal also being fed to the input of the subtracter. The output of the subtracter is amplified and rectified and fed to a trigger circuit to control load current being fed to the output terminals of the power supply.

The system also includes an automatic gain control feedback loop for the four quadrature multiplier, the feedback loop including a rectifier and inverter circuit for the voltage input to the subtracter and a rectifier circuit connected for the current input to the subtracter, the output of the voltage inverter and the output of the current rectifier being fed to a summing point. The summing point provides the input signal for a high gain driver circuit and the driver circuit provides the gain control signal for the four quadrature multiplier to cause the multiplier to provide an output current signal which is of equal magnitude to the voltage signal.

The system also includes an automatic inductance or capacitance correction circuit which is responsive to the change in current with respect to time of the sensed current signal at the buss to correct for any inductance or capacitance which may be present in the output circuit of the power supply due to the natural impedance of the leads connected to the load.

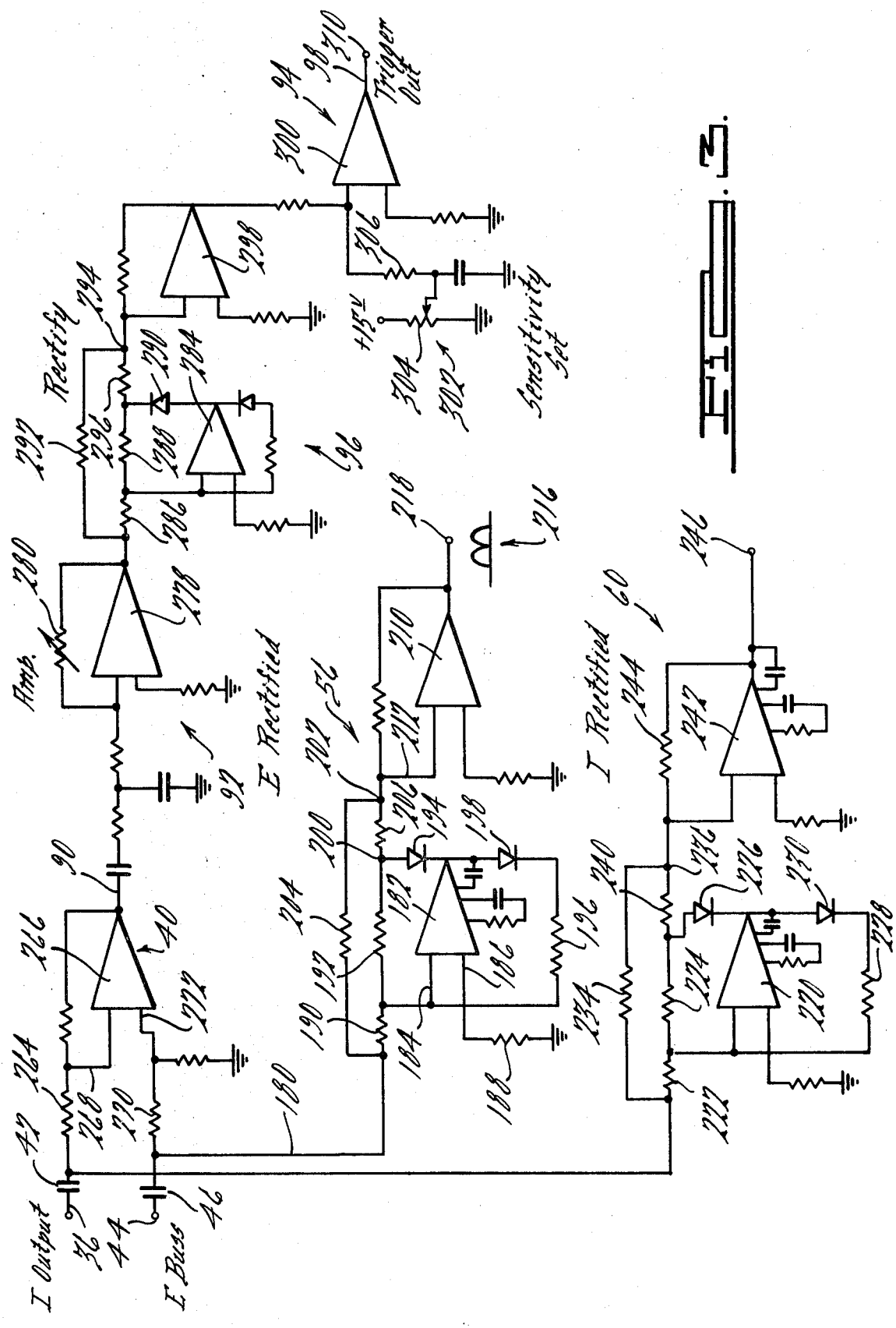

VOLTAGE VERSUS CURRENT SENSING SYSTEM

BACKGROUND AND SUMMARY OF THE DEVELOPMENT

This invention relates generally to an automatic voltage versus current sensing circuit for use in connection with a power supply, and more particularly to an arc or spark sensing circuit, in the case of an electrochemical machining system, or a resistance measuring circuit in the case of an electrochemical painting or other type of variable resistance load process. In the former case, an incipient arcing or sparking is sensed and utilized to immediately limit the current being fed to the load and ultimately to shut down the power supply or, in the latter case, to provide a measure of the resistance of the load for control purposes.

In certain electrolytic processes, particularly those utilizing a gap comprising a tool electrode and a workpiece, there arises certain conditions which are highly deleterious to the workpiece on which the operation is being performed and also on the apparatus being utilized. Referring specifically to electrochemical machining processes, a tool electrode is brought into proximity with the workpiece and an electrolyte is directed between the workpiece and the tool electrode. As electrical energy is applied between the workpiece and tool electrode, material removal from the workpiece occurs. While the material removal process is not totally understood, it has been found that certain conditions arise in the gap which causes the gap to arc or spark, thereby causing pitting and deterioration of the tool electrode and, further, damage to the finish being applied to the workpiece.

One theory as to the cause of the above conditions in the gap relates to the flow of impurities suspended in the electrolyte being passed through the gap, whether the impurity be of an insulating or a conductive character. In the case of an insulating impurity, a portion of the area of the tool electrode being presented to the workpiece is masked, thereby lessening the conductive area for the current flow. Accordingly, the current has a tendency to fall rapidly to present a rapidly decreasing current wave front. Simultaneously, the masking of the workpiece due to the insulating character of the impurity causes a hill to form on the workpiece due to the lack of material removal from the area masked by the impurity.

In certain instances, the impurity is washed away leaving the hill, which is of such a nature as to present a reduced gap to the tool electrode. Thus, subsequent conduction tends to center about the hill, further sharply modifying the amount of current flow. On the other hand, in the situation where the impurity is of a conductive character, the gap is effectively short circuited due to the impurity, thereby causing a sharp rise in current. Similarly, the rise in current presents a steep rising current front to the source of electrical energy and a correlative drop in voltage across the workpiece. A similar situation occurs in electrochemical polishing and other electrochemical processes of this type.

In order to protect both the tool electrode and the workpiece, it is necessary that the incipient sparking ro arcing be sensed as soon as possible after occurrence thereof and to control the operation of the power supply to substantially reduce the current flowing to the load. The earlier the sparking is sensed and adjusted, even to the point of shutting down the power supply, the greater protection provided the workpiece and tool electrode. The normal circuit protectors being utilized in conjunction with such power supplies have not been sufficiently fast acting to preclude damage of this type.

Also, it has been found desirable to provide a control circuit which is responsive to the above described conditions at the load and not responsive to the other conditions in the electrical circuit, as for example in the power supply. Thus, a system has been devised to maintain the current flow through the gap at a maximum in order to achieve the greatest material removal from the workpiece. However, in certain instances, this high gap current will cause the aforementioned arcing or sparking. The system of the present invention is capable of maintaining this maximum current while affording instantaneous protection of the workpiece and tool electrode in the event sparking or arcing occurs.

Further, it has been found that, in the electrochemical painting art, the density or thickness of the paint layer applied is a function of the resistance of the load. Accordingly, the system of the present invention may be utilized to derive a measure of the load resistance, and thus a measure of the paint material being applied to the work, and utilize this signal as a control for the power supply. This control could either take the form of a control for linearly increasing the successive layers of paint being applied or may be utilized to determine the final thickness of paint being applied. In systems of this type, it is common that the paint is rapidly applied when the workpiece is first immersed and current applied due to the fact that the resistance of the load is extremely low, thus providing a high current flow. As the paint in deposited on the workpiece, this current flow is diminished in a nonlinear fashion. Accordingly, the system of the present invention could be utilized to linearize the application of paint to the surface through maintaining a linearly increasing resistance characteristic.

Accordingly, it is one object of the present invention to provide an improved control for a power supply.

It is another object of the present invention to provide an improved control for a power supply which utilizes a voltage versus current characteristic.

It is a further object of the present invention to provide an improved control system for controlling the operation of electrolytic processing apparatus.

It is still another object of the present invention to provide an improved control circuit for generating an output signal which is a function of the load resistance.

It is still another object of the present invention to provide an improved arcing or sparking control system for controlling the output of energy from a power supply to an electrolytic load.

It is another object of the present invention to provide an improved control system for controlling the operation of a power supply or the current being fed to the load in the case where the load is a highly resistive load, system including means for compensating for any inductive or capacitive impedance present in the output conductors.

It is still a further object of the present invention to provide an improved arc or spark sensing control apparatus which is capable of relatively correlating voltage and current magnitude.

It is still another object of the present invention to provide an improved power supply control system for controlling the energy being fed to the load wherein the control system includes an automatic gain control circuit for controlling the operating points of the various subsystems within the circuit.

It is still a further object of the present invention to provide an improved control system for generating a signal which is a function of the resistance of the load.

It is still another object of the present invention to provide an improved control circuit which is extremely fast acting in operation and reliable in use.

Further objects, features and advantages of this invention will become apparent from a consideration of the following description, the appended claims the accompanying drawings in which:

FIG. 3 is a schematic diagram illustrating another portion of the system of FIG. 1 and particularly the voltage and current rectifiers and the output trigger circuit; and FIG. 4 is a schematic diagram illustrating a final portion of the system of FIG. 1 and particularly illustrating the crowbar output rectifier circuit.

With the system of the present invention, current and voltage signals are derived from the output busses, the voltage signal being exactly the magnitude of the voltage across the output buss and the current signal bearing a preselected ratio to the output current.

The current signal is fed through a series of amplifiers to boost the signal to an equivalent magnitude to that of the voltage signal. The system includes an automatic gain control circuit which senses both the current and the voltage and compares these two signals to provide an output signal which is utilized as a multiplication factor in boosting the current signal. Thus, the automatic gain control circuit insures that the current level is equivalent to the voltage level. The voltage and current signals are then compared and subtracted to provide an output signal for a trigger circuit which normally is at a zero level in the case of normal conditions. However, if an abnormal condition, as for example a spark or arc, occurs, the current signal will rise sharply and the voltage signal will drop to produce an unstable condition in the system and provide an output triggering pulse. This triggering pulse is utilized to shunt the output current, shut down the power supply and signal the operator.

As was stated above, it is important that the load be resistive in impedance and, in order to compensate for any slight inductance or capacitance in the load circuit including the buss leads, an automatic inductance correction or $di/dt$ correction circuit has been provided. This correction circuit senses the input current and provides a signal which is fed forward and injected into the current amplification circuit after the multiplication has taken place. Thus, the current signal is automatically compensated for any inductance that may exist in the load circuit. Further, it has been found that the automatic gain control circuit provides a measure of the resistance of the load because the input current is multiplied by the feedback factor to render the current signal exactly equal to the voltage signal. Thus this multiplication factor results in a measure of the resistance in accordance with Ohm's law.

Figure 1:
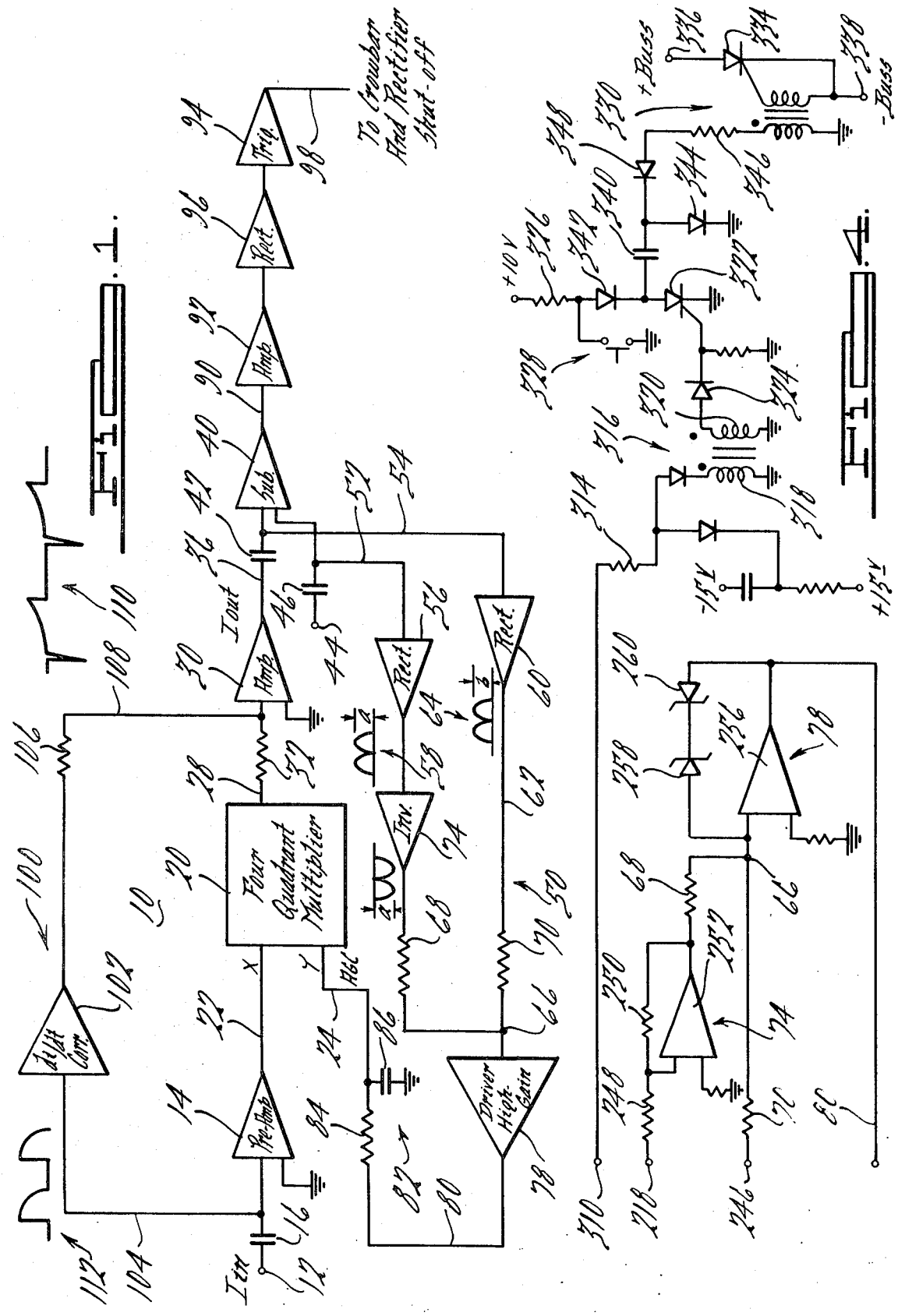
FIG. 1 is a schematic diagram in block form illustrating a preferred system incorporating certain features of the present invention.

Referring now to FIG. 1, there is illustrated a block diagram of a preferred control system 10 incorporating the features of the present invention which is adapted to be connected to the output bussing of a power supply, and particularly to a shunt which derives a current signal which is proportional to the load current flowing in the buss. The shunt is preferably of a noninductive type and a shunt manufactured by the T & M Research Company, Model No. K–10,000–20 has been found particularly suitable. The output of the shunt is fed to an input terminal 12, the terminal 12 being AC coupled with a preamplifier 14 be means of a capacitor 16. The preamplifier preferably has a gain of approximately 50.

The output of the preamplifier 14 is fed to an input terminal of a four quadrant multiplier circuit 20 by means of a conductor 22, the four quadrant multiplier circuit 20 being of the type manufactured by the Motorola Corporation, Semiconductor Division, Model No. MC1595L or Model No. MC1495L. In the particular system to be described, the multiplier 20 is interconnected to generate an output voltage which is a linear product of the two input voltages and provides extreme accuracy and linearity in its operation. The four quadrant multiplier circuit 20 has at least two inputs, an X and a Y input, the Y input being connected to an input terminal 24 from an automatic gain control circuit to be described below. Accordingly, the four quadrant multiplier circuit 20 will provide an output signal on an output conductor 28 which has a magnitude determined by the product of a constant times the input voltages on conductors 22 and 24. In the normal case, the constant is 0.1 and this 0.1 XY signal is fed to an amplifier 30 by means of a resistor 32. The amplifier, in the preferred embodiment, is selected to have a gain of 10 to compensate for the inherent reduction in the product signal created by the four quadrant multiplier circuit 20. Thus, the I out signal from the amplifier 30, as impressed on conductor 36, will be the product of the X and Y signals on conductors 22, 24 respectively.

The output from the amplifier 30 is fed to a subtracter circuit 40 by means of an AC coupling element, in the form of a capacitor 42. The voltage, which is already at a level which may be compared to the amplified current level, is fed directly into the subtracter circuit 40 by means of an input terminal 44 and a capacitor 46.

In order to insure that the current is maintained at a level which will provide a substantially zero output at the output of system 10 during normal operation, a voltage signal is fed to an automatic gain feedback circuit 50 by means of a conductor 52 and a multiplied current signal is fed to the output gain circuit by means of a conductor 54. The voltage signal is fed through a rectifier circuit 56, which produces the output wave form illustrated at 58, this signal being the full wave rectified voltage signal having an amplitude $a$. Similarly, the current signal is fed through a rectifier circuit 60 to produce an output signal on an output conductor 62 having the wave form illustrated at 64, with an output level $b$. In the normal operation of the circuit, $a$ and $b$ will generally be of the same height due to the multiplication of the current signal described above. The outputs of both rectifiers 56 and 60 are fed to a summing node 66 by means of a pair of resistors 68, 70 respectively. However, in order to derive a zero current signal at node 66 in a situation where the amplitudes $a$ and $b$ are equal, the voltage signal is inverted by means on an inverter circuit 74 and, with equal amplitudes of voltage and current signal will produce a zero current at node 66.

The signal at node 66 is fed to a high gain driver circuit 78, which driver circuit provides a small driving current at an output conductor 80 in response to a zero input current from node 66. However, if node 66 should go slightly positive or negative, it being remembered that the current signal may exceed the voltage signal or vice versa, the high gain driver circuit 78 will provide an extremely large output signal on conductor 80. This large output signal on conductor 80 is fed through a single rolloff network 82, including a resistor 84 and a capacitor 86, to the conductor 24 which forms the Y or automatic gain input to the four quadrant multiplier circuit 20. The network 82 is selected to be sufficient to insure that the single rolloff point is achieved in the feedback circuit, this avoiding oscillation or ringing and other undesirable characteristics of a feedback circuit.

The automatic gain control signal impressed on conductor 24 is utilized as the Y input to the four quadrant multiplier circuit 20, the Y input being used as a factor to multiply the current signal impressed on conductor 22. Thus, the output signal on conductor 28 will be some multiplied factor of the current signal on conductor 22, this multiplied factor being determined by the difference between the voltage and multiplied current signal. It will be seen that the signal on conductor 22 is a current signal and the output signal on conductor 28 is equal to the voltage signal being impressed on the voltage input conductor to the subtracter circuit 40, after amplification by amplifier 30. Thus, the signal on conductor 24 is the necessary signal to insure that the current signal on conductor 28 is proportional to the voltage signal.

Therefore, according to Ohm's law, the signal on conductor 22 is multiplied by an automatic gain control signal on conductor 24 which is a function of the resistance of the load circuit. Thus, the signal on conductor 24 provides an indication of the resistance of the load circuit and may be utilized as a control signal in controlling the operation of a power supply or other similar device providing power to an electrochemical painting system. For example, the signal on conductor 24 may be compared to a reference level to shut off the painting operation after a preselected resistance is achieved, the signal indicating a preselected thickness of paint on the workpiece. Also, the signal on conductor 24 may be utilized to control the application of energy to the painting load. For example, the resistance signal on conductor 24 may be utilized to nonlinearly increase the load current to the painting load to maintain a linearly increasing resistance at the load.

As stated above, the subtracter circuit 40 subtracts the instantaneous voltage and current signals being fed to the input circuit thereof to provide an output signal at an output conductor 90 in the event a sudden, opposite change in the voltage and current circuit occurs. This change could be due to a sudden arcing or sparking, as described above, whereby the current rises to a relatively large level in a short period of time while the voltage drops. Normally, the input to the subtracter circuit 40 will be equal and a zero signal will be impressed on conductor 90. The signal level on conductor 90 is amplified by means of an amplifier circuit 92 and fed to an output trigger circuit 94 by means of a rectifier 96. In the event a sparking or arcing occurs, the trigger circuit is supplied with a trigger signal which will energize or provide a firing pulse on an output conductor 98. The output conductor 98, as will be seen hereinafter, supplies a firing signal for a controlled rectifier crowbar circuit and also provides a signal for turning off the rectifier.

As stated above, it is substantially impractical to provide a purely resistance load circuit due to the fact that a certain amount of inductive or capacitive impedance will exist as created by the output busses and other circuit conductors. Accordingly, it has been found desirable to correct for the presence of a slight amount of reactance in the load. As can be seen from the foregoing description, it is important that the voltage and current signals be exactly in phase in order to sense the relative magnitudes of the voltage and current signals. Accordingly, a reactance correction circuit 100 has been provided to inject a compensating current into the output amplifier 30 in response to a sensed rate of change of current with respect to time at the input circuit. The circuit 100 includes an operational amplifier circuit 102 which receives an input from the current input by means of a conductor 104 and injects the output of the correction circuit 102 into the amplifier 30 by means of a resistor 106 and a conductor 108.

The circuit 102 basically comprises a differentiator circuit which provides an output signal proportioned to the rate of change of current with respect to time. It will be remembered that the voltage generated because of the inductive reactance of a circuit is equal to the inductance times the change of current with respect to time. The inductance in any circuit, once it is connected, is constant due to the fact that the inductance is a function of the mechanical characteristics of the circuit, for example, the length and shape of the conductors. Thus, the generation of voltage which is proportional to the rate of change of current with respect to time will be a direct measurement of the inductance of the circuit. One example of the output of the differentiator correction circuit 102 is illustrated at 110 and is seen to be the differentiation of the input signal illustrated at 112, which input signal is a half-wave wave rectified current after the control for the output power has been fired late in the cycle. However, the wave forms in the remainder of the drawings illustrate the operation of the system assuming the full wave is being fed to the load.

In operation, the current input signal from the buss is fed through the input terminal 12 from the shunt unit described above. This signal is fed through the preamplifier 14 to the four quadrant multiplier circuit 20 wherein the signal on conductor 22 is multiplied by a constant and the signal on conductor 24. The output of the four quadrant multiplier is fed to an amplifier 30, the output of which is fed to the subtracter circuit 40. Also, a voltage signal is provided input terminal 44 and is fed directly to the subtracter circuit 40.

The four quadrant multiplier circuit in conjunction with amplifier 30, the amplifier 30 providing the reciprocal of the constant on which the four quadrant multiplier operates, is utilized to maintain the current signal at a level equal to the magnitude of the voltage circuit. Thus, a voltage signal is fed to a summing node 66 by means of a conductor 52, a rectifier 56 and an inverter 74. The current signal, after multiplication, is fed to the node 66 by means of the rectifier 60. Thus if the two signals are identical and one is inverted relative to the other, a zero output signal will be fed to the high gain driver circuit 78. A zero input to the driver circuit 78 provides a slight driving current to the four quadrant multiplier by means of conductor 24. Thus, the signal on the conductor 24 provides the multiplier circuit 20 with the multiplying factor necessary to render the output signal on conductor 36 exactly equal to the voltage signal. Therefore, the signal on conductor 24 is a function of the resistance of the circuit.

Further, the nature inductance of the buss circuit is corrected by means of the inductance correction circuit 102 which senses the buss current and differentiates it to provide or inject a signal into the amplifier 30 which is proportional to the rate of change of current with respect to time.

Further, the natural inductance of the buss circuit is corrected by means of the inductance correction circuit 102 which senses the buss current and differentiates it to provide or inject a signal into the amplifier 30 which is proportional to the rate of change of current with respect to time.

The output of the subtracter, in the normal situation, is substantially zero to provide a zero signal to a trigger circuit 94. However, if the current rapidly rises and the voltage drops, thus creating a multiplying effect, the system cannot correct with sufficient speed to preclude a trigger pulse being fed to the trigger circuit 94. When the trigger circuit 94 has been pulsed, the crowbar circuit will be actuated and the rectifier shut off by means of the signal on conductor 98.

Figure 2:
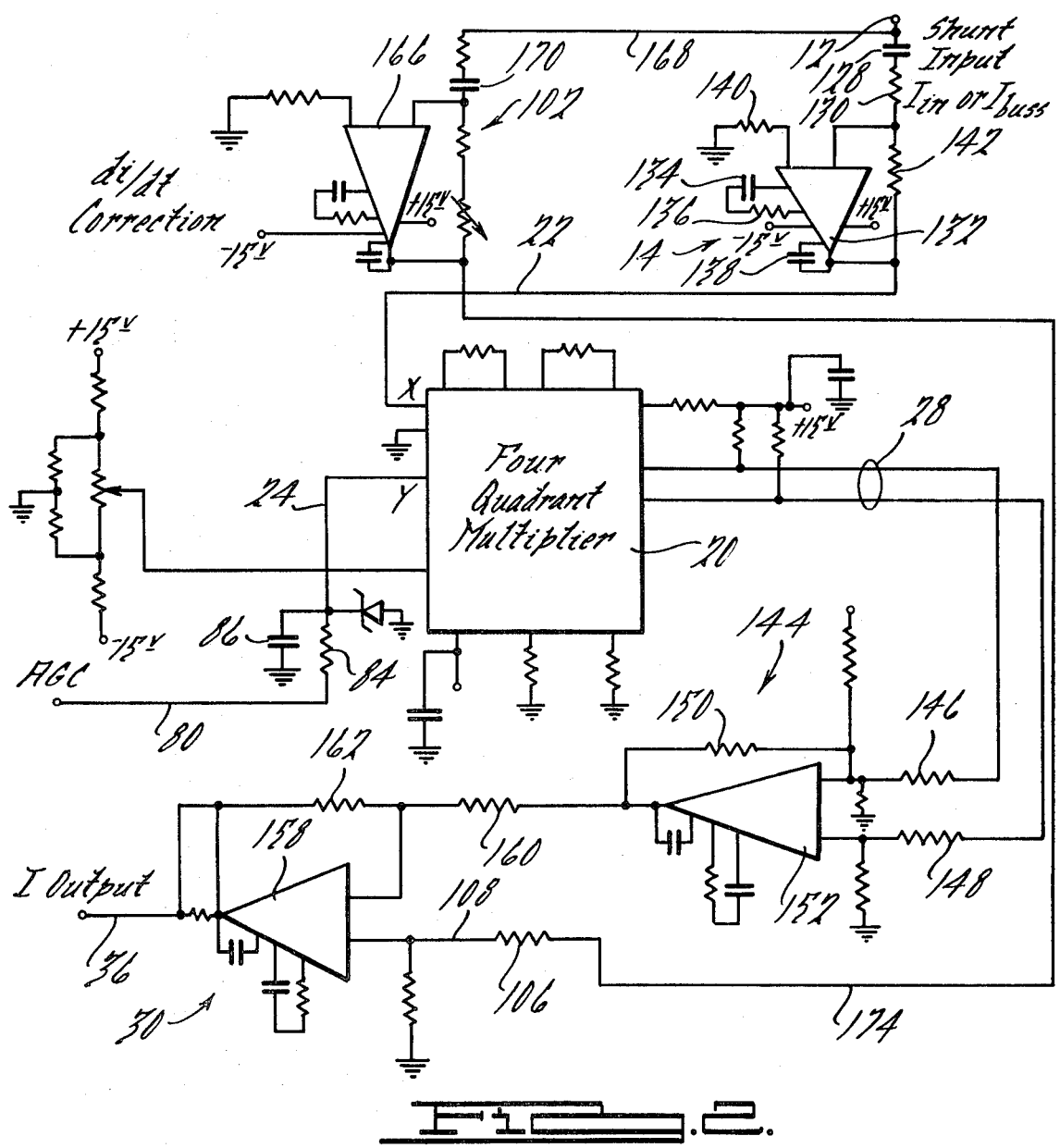
FIG. 2 is a schematic diagram illustrating a portion of the system of FIG. 1, and particularly the quadrature multiplier and the inductance correction loop.

Referring now to FIG. 2, there are illustrated the details of the environment of the four quadrant multiplier circuit 20, the inductive impedance correction circuit 102 and the multiplied current output amplifier circuit 30. It is to be understood in connection with FIGS. 2-4 that identical reference numerals to those used in FIG. 1 will be utilized to represent like systems. Particularly, input current is fed from the input terminal 12, through a capacitor 128 and resistor 130, to the inverting input of an operational amplifier 132 in preamplifier circuit 14. The operational amplifier includes a capacitor 134 and resistor 136 combination for frequency stabilization of the input and a capacitor 138 for frequency stabilization of the output. Also, the noninverting input is grounded through a resistor 140. Each of the elements, 134, 136, 138 and 140 are common to all of the operational amplifiers to be described hereinafter and will not be further described in connection with the following operational amplifiers.

The output of the preamplifier circuit 14 is fed by means of the conductor 22, to the four quadrant multiplier circuit 20 as described above. The output of the four quadrant multiplier circuit is fed to an operational amplifier circuit 144 by means of a plurality of conductors, which conductors correspond to the conductors 28 described in conjunction with FIG. 1. The operational amplifier circuit 144 includes a plurality of input resistors 146, 148 and a feedback resistor 150 for controlling the operation of an operational amplifier 152. The operational amplifier 152 provides a summing of the two outputs on the output conductors 28 and also acts as a buffer stage for the signal being fed to the output amplifier circuit 30.

The output of the operational amplifier 152 is fed to the input circuit of the amplifier circuit 30, and particularly to the inverting input of an operational amplifier 158 by means of a resistor 160. Again, the operational amplifier 158 includes a feedback resistor 162 plus the other circuit interconnections described above.

FIG. 2 also illustrates the rate of change of current with respect to time correction circuit 102 which includes an operational amplifier 166, the input from input terminal 12 being fed to the inverting input thereof by means of a conductor 168. The circuit of FIG. 2 illustrates the input to the $di/dt$ correction circuit being supplied directly from the input terminal by means of the conductor 168 and a capacitor 170. However, the capacitors 128 and 170 may be combined and connected between the input terminal 12 and the conductor 168 as illustrated in FIG. 1. The output of the operational amplifier is fed by means of a conductor 174 and the resistor 106 in conductor 108 to the noninverting input of the operational amplifier 158. It will be noted that the circuit of FIG. 1 indicates that the current correction circuit output is fed to a summing node and thence to the inverting input of the amplifier circuit 30. This system can be utilized in the case where proper polarity is taken into account to subtract the signal from the signal being fed through resistor 32 or where the buss circuit is capacitive. Otherwise, the correction circuit output should be fed to the noninverting input of the amplifier circuit 30. This latter connection is illustrated in FIG. 2 as a modification of FIG. 1. However, in the case of FIG. 2, if the load circuit is capacitive in nature, the output of the operational amplifier 166 will be fed to a summing node connected to the inverting input of the operational amplifier 158. Thus, it is purely a phase consideration if the inductive load provides a signal on conductor 174 which is subtracted from the signal being fed to the input circuit of the amplifier 30. In the case of capacitive loads, the signal on conductor 174 is fed to be additive with the input signal to the amplifier circuit 30.

The remaining connections to the four quadrant multiplier, including amplifier 152, are those recommended by the manufacturer of the above referenced four quadrant multiplier circuit and particular reference is made to the literature on that four quadrant multiplier for fuller understanding of the operation of the multiplier circuit 20. Further, as will be seen from a further description of FIG. 4, the automatic gain control input signal on conductor 80 will control the Y input to the four quadrant multiplier circuit 20 and a provide the multiplier factor for the current on conductor 22. It is the average of this signal on conductor 80 which is a measure of the resistance of the load at any time. The single rolloff operation provided by capacitor 86 and resistor 84 has been described above.

Referring now to the automatic gain control feedback loop, and particularly to FIG. 3, it is seen that the voltage signal on the voltage buss is fed through a capacitor 46 and then to the voltage rectifier circuit 56 by means of a conductor 180. The rectifier circuit includes an operational amplifier 182 which is provided with an input conductors 184, 186 connected to the inverting and noninverting inputs respectively, the latter of which is grounded through a resistor 188. The operational amplifier 182 includes an input resistor 190 and a first feedback resistor 192. The feedback loop includes the resistor 192 and a diode 194 for one-half cycle and a resistor 196 and a diode 198 for the other half cycle fed to the input circuit. Thus, a sine wave input on conductor 180 will be fed to the input conductor 184 and the output at a node 200 will be an inverted half wave rectification of the input curve, with the negative input loops being zero at the output node 200. These negative loops are generated through resistor 196 and diode 198 and are not used.

The resistors 190, 192 are selected to be of the same value so that the operational amplifier operates at unity gain. The signal on conductor 180 is fed forward to a second node 202 by means of a resistor 204 and the signal from node 200 is fed to node 202 by means of a resistor 206. Thus, the input signal on conductor 180 is fed forward to node 202, without inversion, for summing with the signal being impressed on node 200. The resistor 206 is selected to be half of the value of the resistor 204. Thus, the signal from node 200 being fed to the node 202 due to the positive half cycle of the input signal at conductor 180, is a negative half wave which is twice the amplitude of the positive half wave being fed forward through the resistor 204. Thus, the summing network results in a signal at node 202 which is the negative wave form of the positive half cycle introduced at conductor 180. During the negative half wave of the input signal on conductor 180, the node 200 is at a zero potential and the negative half cycle is merely fed forward by means of resistor 204. However, the magnitude is reduced by one-half due to the resistance 204. Thus, the signal at output conductor 202 is an inverted full wave rectification, at half magnitude, of the input signal on conductor 180. This signal at node 202 is fed to a second buffer operational amplifier 210, and particularly to the inverting input thereof at conductor 212, to provide a full wave rectification in the positive direction of the input signal at conductor 180. This signal is illustrated at 216 and is impressed on an output conductor 218. Thus, the circuit 216 is an absolute value circuit.

The current rectifier circuit 60 is identical to that described above in connection with the description of the voltage rectifier circuit 56. Particularly, the current circuit 60 includes an operational amplifier 220 provided with the input resistor 222, the feedback resistor 224 and the diode 226. The opposite half cycle is generated by means of a resistor 228 and a diode 230. The circuit 60 further includes a feed-forward resistor 234 which is connected to a node 236, the output of the operational amplifier 220 also being fed to the node 236 by means of a resistor 240. The full wave rectified signal at node 236 is then fed to an inverting buffer amplifier 242, which includes a feedback resistor 244. The output of the current rectifier circuit is fed to a node 246.

Referring now to FIG. 4, the voltage signal at output terminal 218 is fed to the inverter circuit 74 by means of a resistor 248. The inverter circuit 74 further includes a feedback resistor 250 which is connected between the input and output of an operational amplifier 252. The output of the operational amplifier 252 is fed to the summing node 66 through the resistor 68 and the rectified current signal is fed directly from the input terminal 246 to the summing node 66 through the resistor 70.

The summing node 66 is connected to the high gain driver circuit 78, and particularly to the inverting input of an operational amplifier 256. The operational amplifier includes a pair of back-to-back connected zener diodes 258, 260 to prevent the output from saturating into its limits to render the operational amplifier 256 an extremely fast and high gain amplifier. The output of the operational amplifier 256 is fed to the automatic gain control conductor 80 which is connected to the Y input of the four quadrant multiplier circuit 20 described in conjunction with FIG. 2. It is the average of this signal on conductor 80 which represents a function of the resistance of the load circuit and also provides a multiplication factor for the current signal.

Referring back to FIG. 3, the current and voltage signals being impressed on conductors 36 and 44 are fed through the capacitors 42 and 46 to the subtracter circuit 40. Particularly, the current output signal is fed through a resistor 264 and then to the inverting input of an operational amplifier 266 by means of a conductor 268. On the other hand, the voltage signal is fed to the noninverting input of operational amplifier 266 by means of a resistor 270 and a conductor 272. The operational amplifier 266 performs the subtracting operation between the signals on conductors 268, 272 and provides a difference signal on output conductor 90. This difference signal will be minimal when the voltage and current signals, after multiplication of the current signal are of equal magnitude and in phase. However, if the circuit is not fast acting enough to correct for changes in voltage and current, particularly in the case of a sparking or arcing condition, an output will appear on conductor 90 and will be fed to the amplifier circuit 92.

The amplifier circuit 92 includes an operational amplifier 278 which includes a variable feedback resistor 280 to vary the gain of the amplifier 278. The output of the amplifier 278 is fed to the rectifier circuit which is of substantially identical configuration to that described in conjunction with the rectifier circuits 56 and 60.

Particularly, the rectifier circuit 96 includes an operational amplifier 284 which includes an input resistor 286, a feedback resistor 288, the rectifying diode 290, a feed forward resistor 296, a summing node 294 and an input resistor 296 for the summing node 294. Thus, the output signal at node 294 is the absolute value of the input signal being fed from the operational amplifier 278 and the signal at node 294 is inverted by means of an inverting and buffer operational amplifier 298. The output signal from the operational amplifier 298 is fed to the output trigger circuit, and particularly to the inverting input of an operational amplifier 300. The operational amplifier 300 also includes a second input from a sensitivity setting circuit 302 which includes a potentiometer 304 connected between a positive 15 volt potential and ground and a current limiting resistor 306. Thus, an output trigger pulse is generated at an output terminal 310 whenever the output signal from the operational amplifier 298 exceeds the setting on potentiometer 304.

Referring back to FIG. 4, there is illustrated a preferred form of crowbar circuit to which the output trigger pulse at terminal 310 is fed. Particularly, the signal on input terminal 310 is fed through a resistor 314 to an isolation pulse transformer 316, the transformer 316 including a primary winding 318 and a secondary winding 320 magnetically coupled thereto. The output of the pulse transformer 316 is fed to the gate circuit of a control controlled rectifier 322 through a diode 324. The controlled rectifier 322 is connected to a source of direct current potential through a resistor 326 and a reset button 328 has been provided to stop conduction of the controlled rectifier 322 manually by the operator, upon clearing of the condition which caused the sparking or arcing. The conduction of controlled rectifier 322 generates an output pulse signal through pulse transformer 330, the secondary of which is connected between the gate cathode circuit of a crowbar controlled rectifier 334. The crowbar controlled rectifier 334 is connected between the positive buss, at a terminal 336 and the negative buss, at terminal 338.

The output circuit also includes a capacitor 340 which, when the control rectifier 322 is nonconductive, is charged from positive to negative through a circuit including the resistor 326, a diode 342, the capacitor 340 and a diode 344 connected to ground. When the controlled rectifier 322 conducts, the capacitor 340 discharges through a circuit including the primary winding of the pulse transformer 330, a resistor 346, a diode 348, the capacitor 340 and the controlled rectifier 322 to generate a steep wave front pulse for use by the output pulse transformer 330.

While it will be apparent that the preferred embodiments of the invention disclosed are well calculated to fulfill the objects above state, it will be appreciated that the invention is susceptible to modification, variation and change without departing from the proper scope or fair meaning of the subjoined claims.

1. In a circuit for sensing the sudden deviation of the current relative to the voltage in a load circuit and generating an output signal in response thereto, the improvement comprising sensing means for sensing a characteristic of the load current and the load voltage, multiplier circuit means connected to one of said current and voltage sensing means for providing one input to said multiplier circuit means, said multiplier circuit including means for varying the characteristic of said one of the sensed current and voltage in response to the other of the sensed current and voltage for equalizing the sensed characteristic of both the current and voltage, said multiplier circuit having an inherent response time and output circuit means connected to be responsive to said equalized and the other current and voltage characteristic for generating the output signal when said characteristics become unequal due to the suddenness of the deviation exceeding the response time.

2. The improvement of claim 1 wherein said multiplier circuit means varies the characteristic of the sensed current to adjust the magnitude of said current to equal the magnitude of said voltage.

3. The improvement of claim 2 wherein said multiplier circuit means includes a quadrant multiplier circuit having first and second input circuits, said first input circuit being fed a current signal from said sensing means.

4. The improvement of claim 3 further including feedback circuit means for sensing the characteristic of said voltage and providing an input signal in response thereto the second input of said quadrant multiplier circuit.

5. The improvement of claim 4 wherein said feedback circuit means also includes means for sensing the characteristic of said current and a circuit for correlating said voltage and current characteristics.

6. The improvement of claim 5 wherein said feedback circuit includes a summing node for summing said current and voltage characteristics.

7. The improvement of claim 6 wherein said feedback circuit means includes a rectifier connected to said voltage sensing circuit, a second rectifier for sensing the varied characteristics of said current and an inverter circuit connected to one of said rectifiers, the output of said rectifiers being fed to said summing node.

8. The improvement of claim 7 wherein said summing node provides an output signal which is substantially zero when said rectified and inverted signal is equal to said rectified signal.

9. The improvement of claim 8 wherein the output of said summing node is fed to second input of said quadrant multiplier circuit, the output of said quadrant output circuit being a function of the product of said current signal and said summing node signal.

10. The improvement of claim 9 wherein said quadrant multiplier circuit generates an output signal in response to said current signal and summing summing node signal to multiply the current signal to a level equal to the magnitude of said voltage signal.

11. The improvement of claim 10 wherein said output circuit means includes a subtracter circuit, the input of said subtracter being responsive to said multiplied current signal and said voltage signal, the output of said subtracter being substantially zero when said multiplied current and voltage characteristics are equal.

12. The improvement of claim 7 wherein said rectifier includes an operational amplifier having a feedback loop, said operational amplifier being responsive to an alternating current input signal, said operational amplifier further including a summing node and a feed-forward circuit, said feedback and feed-forward circuits generating a full wave, rectified output signal in response to said input alternating current signal; and said feedback loop including a high gain driver, said driver generating a high gain output signal for said second input to said quadrant multiplier circuit, said driver output being a function of the resistance of said load circuit.

13. The improvement of claim 7 wherein said feedback loop generates a signal for said second input in response to said voltage and current characteristics in accordance with a function defined by said voltage divided by said current.

14. The improvement of claim 1 wherein said multiplier circuit means includes a first and second input, said first input being a function of said sensed current signal and said second input being a function of said voltage divided by said current.

15. The improvement of claim 1 wherein said load circuit includes an electrochemical painting apparatus for applying a layer of paint to a surface wherein the thickness of paint in the load circuit determines the resistance of said load circuit, the variation of said characteristic being a function of the resistance of said load circuit.

16. The improvement of claim 15 wherein said multiplier circuit means varies the characteristic of the sensed current to adjust the magnitude of said current to equal the magnitude of said voltage.

17. The improvement of claim 16 wherein sad multiplier circuit means includes a quadrant multiplier circuit having first and second input circuits, said first input circuit being fed a current signal from said sensing means, and feedback means for sensing characteristic of said voltage and said current, and providing an input signal in response thereto to the second input of said quadrant multiplier circuit.

18. The improvement of claim 17 wherein said feedback circuit means includes a summing node for correlating said voltage and current characteristics and generating an output signal when said characteristics deviate, one from the other.

19. The improvement of claim 18 wherein the output of said summing node is fed to the input circuit of said quadrant multiplier circuit, the output of said quadrant circuit being a function of the product of the input current signal and the output signal from said summing node, the summing node signal being a function of the resistance of the load.

20. In a circuit for sensing the sudden deviation of a current relative to the voltage in a load circuit wherein the sensing circuit has an inherent response time, the method of generating an output signal in response to the sudden deviation comprising the steps of sensing characteristic of load current and the load voltage, varying the characteristic of one of the sensed current and voltage in response to the other of the sensed current and voltage for equalizing the sensed characteristic of both the current and voltage and generating the output signal when said characteristics become unequal in response to the time of the sudden deviation exceeding the response time.

21. The method of claim 20 wherein said characteristic varying step includes generating an output signal which is a function of said current signal and a multiplication factor signal to adjust the current signal so that the current signal is equal in magnitude to the voltage signal.

22. The method of claim 21 wherein said multiplication signal is a function of both said voltage and said current signals in accordance with a function defined by the voltage signal divided by the current signal.

23. The method of claim 22 wherein said multiplication signal is a measure of the resistance of the load circuit.

24. The method of claim 23 further including the step of sensing the current signal with reactive impedance correction circuit, and adjusting the current signal in accordance with a function of the rate of change of current with respect to time in the load circuit.

25. The method of claim 24 wherein said multiplier signal is utilized to control the resistance of the load.